(12) United States Patent
Wong et al.

(10) Patent No.: US 9,762,815 B2
(45) Date of Patent: Sep. 12, 2017

(54) CAMERA TO CAPTURE MULTIPLE SUB-IMAGES FOR GENERATION OF AN IMAGE

(71) Applicant: Intel Corporation, Santa Clara, CA (US)

(72) Inventors: Hong W. Wong, Portland, OR (US); Wah Yiu Kwong, Beaverton, OR (US); Jiancheng Tao, Shanghai (CN); Xiaoguo Liang, Shanghai (CN); Andy Keates, Los Gatos, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/417,551

(22) PCT Filed: Mar. 27, 2014

(86) PCT No.: PCT/CN2014/074195
§ 371 (c)(1),
(2) Date: Jan. 26, 2015

(87) PCT Pub. No.: WO2015/143670
PCT Pub. Date: Oct. 1, 2015

(65) Prior Publication Data
US 2016/0044251 A1    Feb. 11, 2016

(51) Int. Cl.
*H04N 5/272* (2006.01)
*G02B 13/00* (2006.01)
(Continued)

(52) U.S. Cl.
CPC ........... *H04N 5/272* (2013.01); *G02B 13/002* (2013.01); *H04N 5/2254* (2013.01);
(Continued)

(58) Field of Classification Search
CPC ............ H04N 5/23238; H04N 5/3415; H04N 3/1593; H04N 2013/0088; G06K 2009/2045
(Continued)

(56) References Cited

U.S. PATENT DOCUMENTS 7,683,962 B2    3/2010   Border et al.
8,289,409 B2 *  10/2012  Chang .................... G03B 17/12
                                                    348/218.1
(Continued)

FOREIGN PATENT DOCUMENTS

CN     1912664      2/2007
CN     101378559    3/2009
(Continued)

OTHER PUBLICATIONS

Cosshall, Wayne, "Understanding Canon EF-S, Nikon DX and similar lenses for small sensor digital SLR cameras," digital imageMaker international, posted on May 23, 2009, and retrieved Jan. 26, 2015, via URL: http://www.dimagemaker.com/2009/05/23/understanding-canon-ef-s-nikon-dx-and-similar-lenses-for-small-sensor-digital-slr-cameras.
(Continued)

*Primary Examiner* — Kelly L Jerabek
(74) *Attorney, Agent, or Firm* — Blakely Sokoloff Taylor and Zafman LLP

(57) ABSTRACT

Embodiments are generally directed to a camera to capture multiple sub-images for the generation of an image. An embodiment of a camera assembly includes one or more lenses to transmit light from a scene, and an image sensor to simultaneously capture a plurality of sub-images of the scene via the one or more lenses, the plurality of sub-images including a first sub-image and a second sub-image. A processing element is to process the sub-images sensed by
(Continued)

the image sensor, the processing of the sub-images includes combining at least the first sub-image and the second sub-image to generate a combined image of the scene.

21 Claims, 9 Drawing Sheets

(51) Int. Cl.
*H04N 5/225* (2006.01)
*H04N 5/232* (2006.01)

(52) U.S. Cl.
CPC ....... *H04N 5/2256* (2013.01); *H04N 5/23238* (2013.01); *H04N 5/23248* (2013.01); *H04N 5/23296* (2013.01)

(58) Field of Classification Search
USPC .................................. 348/218.1, 239, 374
See application file for complete search history.

(56) References Cited

U.S. PATENT DOCUMENTS

| | | | |
|---|---|---|---|
| 8,355,042 B2 | 1/2013 | Lablans | |
| 2005/0134699 A1* | 6/2005 | Nagashima | G02B 13/0055 348/218.1 |
| 2008/0056612 A1 | 3/2008 | Park et al. | |
| 2009/0079817 A1* | 3/2009 | Su | H04N 13/004 348/47 |
| 2009/0102956 A1* | 4/2009 | Georgiev | H04N 5/23212 348/315 |
| 2011/0069189 A1* | 3/2011 | Venkataraman | H01L 27/14618 348/218.1 |
| 2013/0033577 A1 | 2/2013 | Lo | |
| 2013/0147910 A1* | 6/2013 | Xin | H04N 5/23238 348/38 |
| 2013/0235149 A1* | 9/2013 | Tanaka | H04N 5/23238 348/36 |
| 2013/0258044 A1* | 10/2013 | Betts-Lacroix | H04N 13/0242 348/36 |
| 2013/0265459 A1* | 10/2013 | Duparre | H04N 5/23238 348/218.1 |
| 2014/0028790 A1* | 1/2014 | Ishida | H04N 5/23238 348/36 |
| 2014/0176775 A1* | 6/2014 | Ichikawa | H04N 5/2624 348/333.05 |

FOREIGN PATENT DOCUMENTS

| | | |
|---|---|---|
| CN | 202143153 U | 2/2012 |
| CN | 103167223 | 6/2013 |
| KR | 2011-0050242 | 5/2011 |
| TW | CN 101207784 A | 6/2008 |
| TW | CN 102131044 B | 7/2011 |

OTHER PUBLICATIONS

"Teardown of the HTC EVO 4G Smart Phone," Chipworks Blog, Jun. 4, 2010, retrieved Jan. 26, 2015, via URL: http://www.chipworks.com/en/technical-competitive-analysis/resources/blog/teardown-of-the-htc-evo-4g-smart-phone/.
Dipert, Brian, "Imaging beyond pixels: Low-light sensors, low-power zoom lenses, antishake technology, and innovative optics enhance digital still cameras," Mar. 15, 2007, retrieved on Jan. 26, 2015, via URL: http://www.edn.com/design/integrated-circuit-design/4315685/Imaging-beyond-pixels-Low-light-sensors-low-power-zoom-lenses-antishake-technology-and-innovative-optics-enhance-digital-still-cameras.
International Search Report and Written Opinion of the International Searching Authority dated Jan. 6, 2015, in International Patent Application No. PCT/CN2014/074195, 12 pages.
"Taiwain Search Report mailed on Jan. 21, 2016 (+ English Translation), Taiwanese Patent Applciation No. 104104757, 2 pages."
"Taiwan First Office Action mailed Jan. 21, 2016 (+ English Translation), Taiwanese Patent Application No. 104104757, 14 pages"
Notice of Allowance in Taiwanese Application No. 104104757, dated May 31, 2016, 2 pages.
International Preliminary Report on Patentability for International Patent Application No. PCT/CN2014/074195, dated Oct. 6, 2016, 6 pages.
Preliminary Rejection (+English Translation) for Korean Application No. 2016-7023372, dated Apr. 20, 2017, 13 pages.

* cited by examiner

CAMERA TO CAPTURE MULTIPLE SUB-IMAGES FOR GENERATION OF AN IMAGE

CROSS-REFERENCE TO RELATED APPLICATION

This application is a U.S. national phase of International Patent Application No. PCT/CN2014/074195 filed Mar. 27, 2014, the contents of which application is incorporated herein by reference in its entirety.

TECHNICAL FIELD

Embodiments described herein generally relate to the field of electronic devices and, more particularly, a camera to capture multiple sub-images for the generation of an image.

BACKGROUND

As the use of mobile devices has expanded, the demands on the image capture capabilities of such devices have increased. Where low-resolution cameras for occasional photos were once acceptable in mobile devices, modern devices require cameras that are capable of high-resolution photography in difficult conditions, such as low light environments. These requirements are being applied to the front-facing cameras of such devices, which face the user of the devices, as well as the rear-facing cameras as devices are increasingly being used for video communications, including use to capture images of users for Skype™ and Microsoft Lync® communications.

At the same time, in order to provide better user experience in using mobile devices, newer mobile devices have larger displays than older devices, with the display covering more of the front face of mobile devices than was true in older mobile devices.

However, the improvements in mobile device displays have had the side effect of limiting the space for placement of a camera on the front side of a mobile device because the bezel of such devices has been reduced to allow for an increased display sizes for a particular size of mobile device.

BRIEF DESCRIPTION OF THE DRAWINGS

Embodiments described here are illustrated by way of example, and not by way of limitation, in the figures of the accompanying drawings in which like reference numerals refer to similar elements.

DETAILED DESCRIPTION

Figure 1:
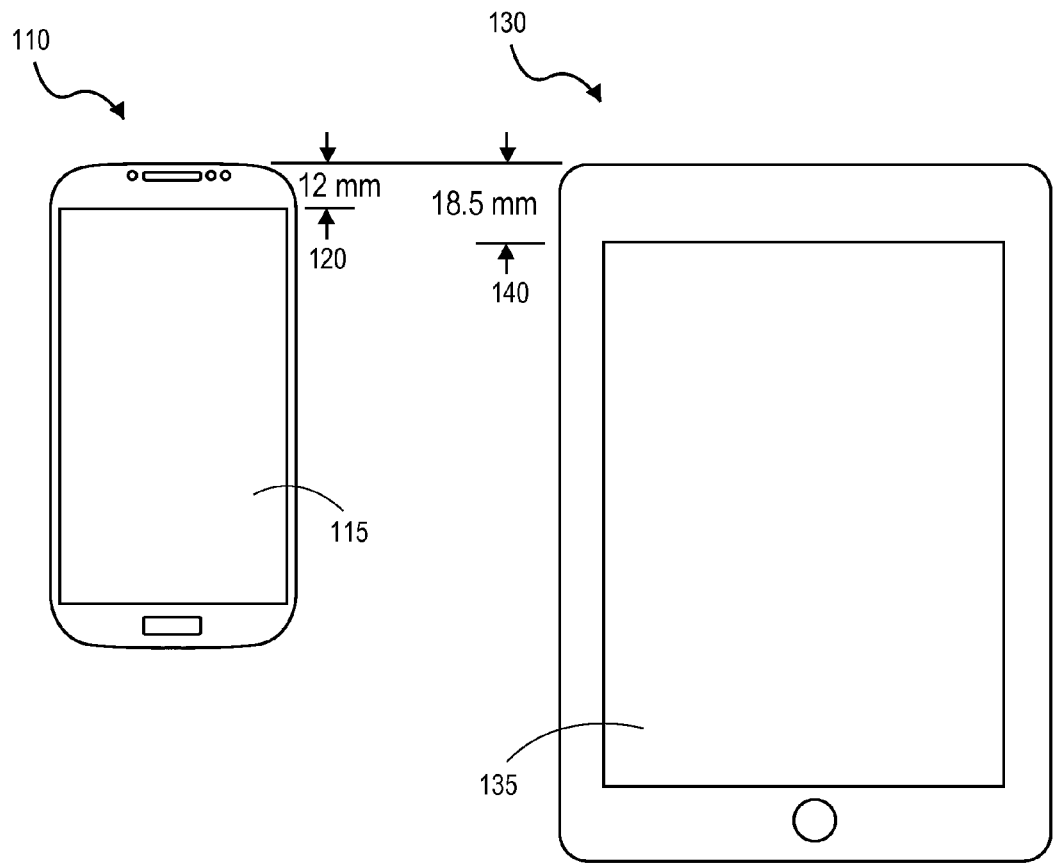
FIG. 1 is an illustration of mobile devices to include an embodiment of a camera assembly.

Embodiments described herein are generally directed to a camera to capture multiple sub-images for the generation of an image.

For the purposes of this description:

"Mobile device" means a smartphone, smartwatch, tablet computer, handheld computer, mobile Internet device, wearable technology, or other mobile apparatus that includes processing ability and communication ability.

"Camera" or "camera assembly" means an apparatus or subsystem for capturing images, including still photographs and video images. A camera assembly may further include processing of images. For purposes of a mobile device, a camera having a lens on a first side of the mobile device, the first side includes a main display, may be referred to as a front-facing camera and a camera having a lens on a second side of the mobile device, the second side not including a main display, may be referred to as a rear-facing camera. A camera includes, but is not limited to, a lens and an image sensor. A camera may further include a processing unit.

"Lens" means one or more optical elements for transmission of light from a scene to an image sensor. Each optical element of a lens may be a simple lens (a single element to refract light), a mirror, or other element to transmit or otherwise affect light. A lens including multiple lens elements may be referred to as a compound lens.

"Aspheric lens" means a lens including at least one simple lens with surface profiles that are not portions of a sphere or cylinder. In a particular example, an aspheric lens may include a lens in an oval shape with one dimension that is larger than another, or, stated in another way, with a diameter through the semi-major axis (the largest axis of the oval) that is larger than a diameter through the semi-minor axis (the smallest axis of the oval).

Cameras on mobile devices are increasing used for functions that require high performance. For example, a camera on a mobile device is required to provide good low light performance in order to be certified for certain video communication operations, including Skype™ and Microsoft Lync® certification. Further, it may be expected that certification requirements will expand and become more stringent in the future in order to provide improved user experience in video communications.

Another aspect of improved camera performance is the increasing resolution of mobile device cameras. The increase in camera resolution provides improved image clarity, but may have a negative impact on low light performance. In general, a larger image sensor is needed to maintain the low light performance as the number of pixels for the image sensor increases. Other technologies are also driving the need for low light performance for cameras, such as facial recognition of the end user of a device to effect computer login authentication.

However, the location of a camera in an apparatus, in particular a mobile device, is limited by the physical dimensions of the apparatus. In particular, the bezel width of a forward side of a mobile device (where "bezel" refers to the portion of the device around or beside a display screen or input elements on a front side of the device), where a camera lens would generally be installed, limits the size of the lens and optical sensor in at least one dimension (referred to herein as the Y dimension of the mobile device).

In camera assemblies, an increase in the size of the camera image sensor is a common modification to enhance the low light performance of the camera. However, with the physical limitations of a mobile device, a simple increase in size of the image sensor may not be practical. Other possible conventional solutions include better and faster lenses and BSI (backside illumination). However, these conventional solutions may not be sufficient to provide acceptable low light performance in a device such as mobile device having a limited physical dimension for the camera.

In general, designing a lens for an image circle becomes increasingly difficult as the image circle increases in size. The larger lens typically uses more lens elements and may require more expensive lens elements because of the need for more aspheric or special glasses to keep the image sharp and evenly lit over the larger image circle. For these reasons, the lens for a larger image sensor is generally larger, heavier and more expensive. Thus, in general creating a lens for a smaller sensor is easier and less expensive to produce than a lens for a larger sensor at the same level of lens performance. This factor is true for lenses for medium and large format cameras as well as lenses for small format cameras, such as mobile device camera assemblies.

In some embodiments, an apparatus, system, or process includes wide image sensing to simultaneously capture multiple sub-images. In some embodiments, a camera provides enhanced low light performance while reducing impact to the overall system's Y-dimension through use of wide image sensing to capture multiple sub-images. In some embodiments, a camera includes wide aspect ratio image sensing together with modified lens design and image processing to enable both a compact form factor and enhanced low light performance for use in, for example, mobile devices or other devices with limited physical size.

In some embodiments, a camera assembly includes one or more lenses to transmit multiple portions of an image (referred to herein as sub-images) of a scene on one or more image sensors, the one or more image sensors having a width sufficient to receive the multiple sub-images. The sub-images may overlap. In some embodiments, a processor or other image processing element provides for combining at least a first sub-image and a second sub-image to generate a combined image. In some embodiments, the one or more lenses transmit at least a first sub-image and a second sub-image that differ in a first dimension, such as a vertical differentiation of the first and second sub-images, in order that the first sub-image and the second sub-image are arranged along a second dimension, such as a horizontal arrangement, onto the one or more image sensors. In some embodiments, a processing element processes the sub-images including stitching the sub-images together to generate a combined image of the original scene. While the examples described and illustrated herein illustrate two sub-images, embodiments are not limited to two sub-images, and may include a larger number of sub-images.

FIG. 1 is an illustration of mobile devices to include an embodiment of a camera assembly. As illustrated in FIG. 1, a mobile device may include, but is not limited to, a smart phone 110 or a tablet computer 130. The smart phone 110 includes a display screen 115 on a first side of the smart phone, and the tablet computer 130 includes a display screen 135 on a first side of the tablet computer. Each mobile device 110, 130 includes a bezel, or Y-dimension 120, 140, of a certain size. In the particular examples shown in FIG. 1, the available Y-dimension 120 for the smart phone is 12 mm (millimeters) and the available Y-dimension 140 for the tablet computer 130 is 18.5 mm.

However, the usable Y-dimension of each mobile device 120, 140 is actually smaller than the indicated sizes because of the width of the cover material. Depending on the curvature of the mobile device cover, the shape of the cover may further limit the usable Y-dimension.

One potential solution to the installation of a larger image sensor is to increase the Y-dimension of a mobile device, but this choice reduces the space available for the display screen 115, 135 of the mobile device, thereby reducing the functionality and attractiveness of the device for users.

In some embodiments, the mobile devices 110, 130 include camera assemblies that provide improved low-light performance though use of wide image sensing to simultaneously capture multiple sub-images of a scene, with two or more sub-images being combined to generate a combined image of the scene.

Figure 2A:
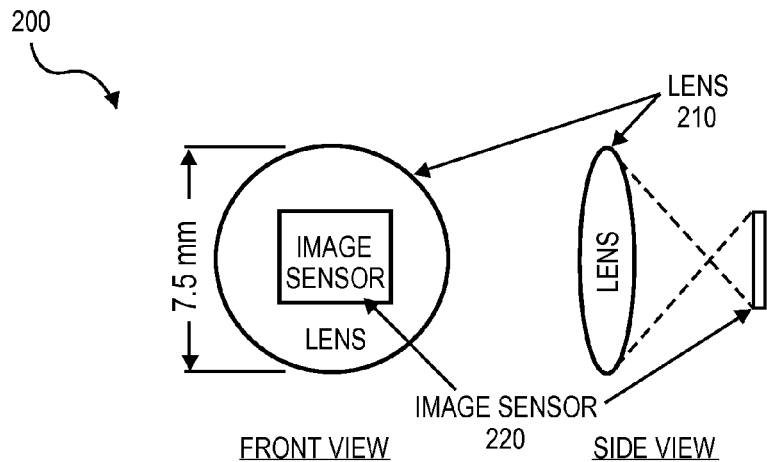
FIGS. 2A and 2B illustrates examples of conventional lenses and image sensors.
Figure 2B:
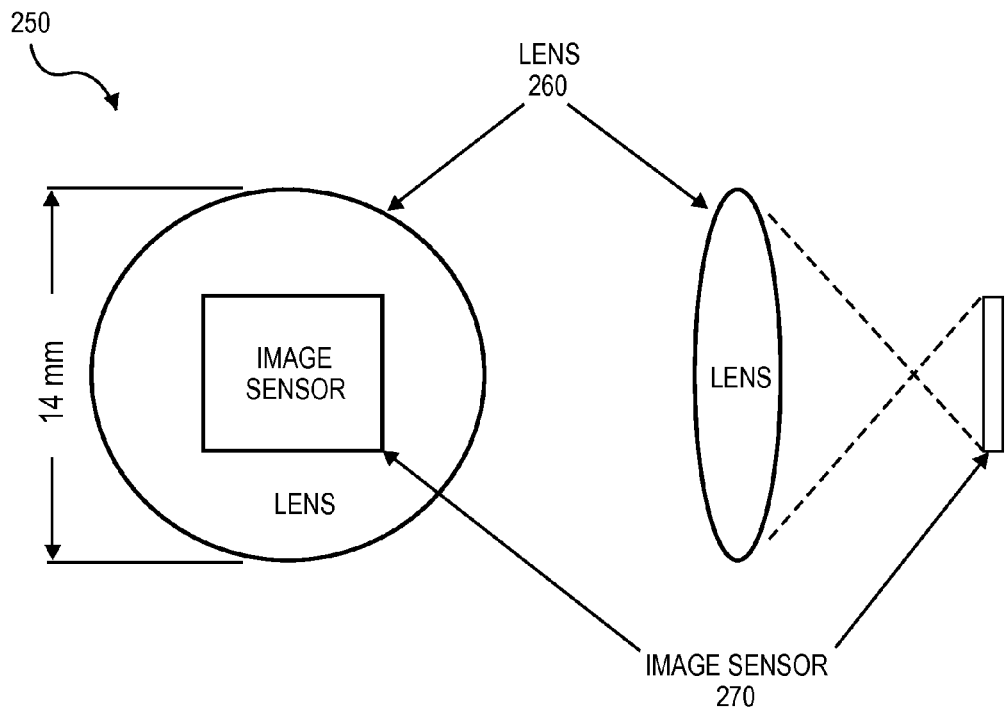

FIGS. 2A and 2B illustrates examples of conventional lenses and image sensors. FIG. 2A illustrates front and side views of a first conventional camera assembly 200 including a small aspect lens 210, which in this example is 7.5 mm in diameter, and an image sensor 220. The camera assembly 200 may be utilized in, for example, a mobile device. However, an image sensor of this size may not provide sufficient low light performance for certain purposes, including video communications.

To improve low light performance, FIG. 2B illustrates front and side views of a second conventional camera assembly 250, the camera assembly 250 including a larger lens 260 and image sensor 270 to allow for the collection of a greater quantity of light. In this example, the diameter of the lens 260 has been increased to 14 mm.

However, while the second camera assembly 250 may provide improved low light performance in comparison with the first camera assembly 200, such camera assembly 250 may be too large to fit within the physical constraints of a device. In particular, the lens and image sensor may be too large to fit within the bezel area (the available Y-dimension) of the front side (the display side) of a mobile device. For this reason, the camera assembly 250 may not be usable as a front-facing camera of such a device.

Figure 3A:
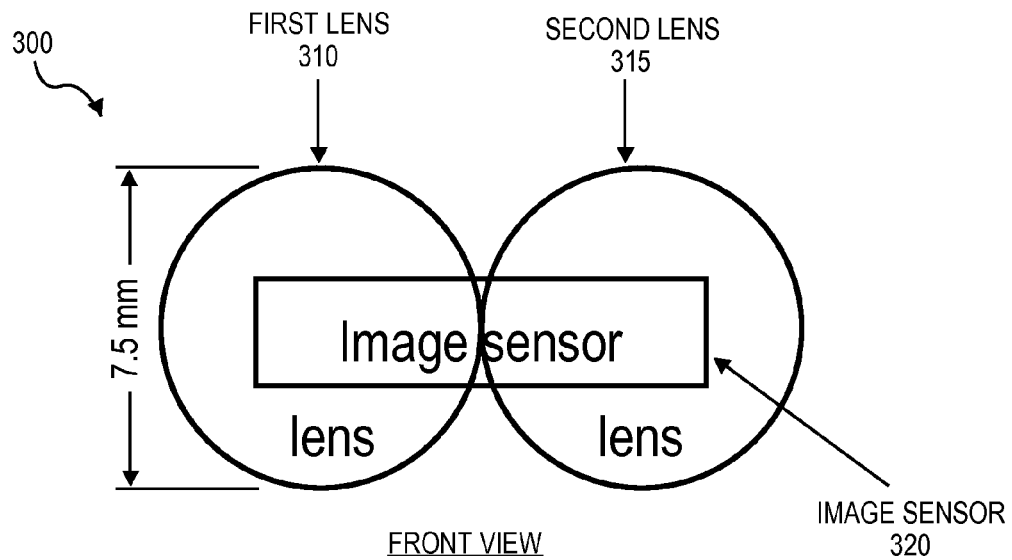
FIG. 3A is an illustration of elements of an embodiment of a camera assembly including multiple lenses.

FIG. 3A is an illustration of elements of an embodiment of a camera assembly including multiple lenses. As illustrated in a front view in FIG. 3A, an embodiment of a camera assembly 300 includes multiple lenses to simultaneously capture multiple sub-images, such as a first lens 310 to transmit light for a first sub-image and a second lens 315 to transmit light for a second sub-image. In some embodiments, the camera assembly 300 includes a wide image sensor 320, wherein the sub-image from the first lens 310 is directed to a first portion of the image sensor 320 and the second sub-image from the second lens 315 is directed to a second portion of the image sensor 320. In some embodiments, the wide image sensor 320 includes a single sensor element. In some embodiments, the wide image sensor 320 includes multiple sensor elements, such as a first sensor element for the capture of the first sub-image and a second sensor element for the capture of the second sub-image.

In some embodiments, the multiple lenses 310, 315 reduce the impact in a first dimension by the arrangement side by side along a second dimension. As illustrated in FIG. 3A each of the lenses 310, 315 is 7.5 mm in diameter, and thus the total width in the Y-dimension is 7.5 mm because the multiple lenses are arranged in the X-dimension. However, with two lenses the amount of light being transmitted is increased in comparison with a single lens. The light transmitted has essentially been doubled, but the effective increase in captured light may vary depending on the specific implementation. Further, the image sensor 320 is increased in size only in the X-dimension, thus reducing any impact in the Y-dimension for the camera assembly while improving the low light performance of the camera assembly 300.

Figure 3B:
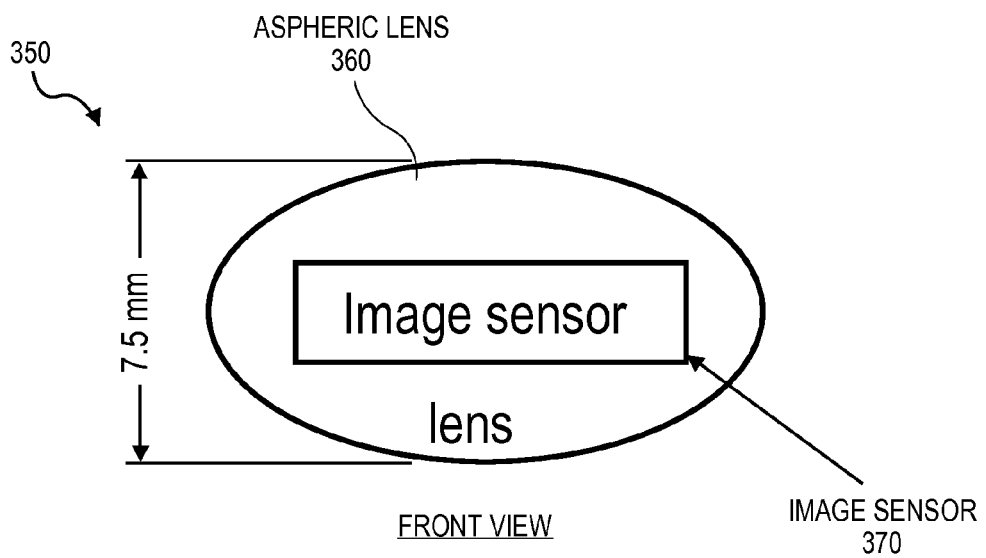
FIG. 3B is an illustration of elements of an embodiment of a camera assembly including an aspheric lens.

FIG. 3B is an illustration of elements of an embodiment of a camera assembly including an aspheric lens. As illustrated in a front view in FIG. 3B, an embodiment of a camera assembly includes an aspheric lens 360 to simultaneously capture multiple sub-images. In some embodiments, the aspheric lens 360 is formed to generate multiple sub-images from a scene, the aspheric lens 360 being shaped such that the lens is substantially larger in a second dimension than the lens is in a first dimension. In some embodiments, camera assembly includes a wide image sensor 370, wherein the a first sub-image transmitted by the aspheric lens 360 is directed to a first portion of the image sensor 370 and a second sub-image transmitted by the aspheric lens 370 is directed to a second portion of the image sensor. In some embodiments, the wide image sensor 370 includes a single sensor element. In some embodiments, the wide image sensor 370 includes multiple sensor elements, such as a first sensor element for the capture of the first sub-image and a second sensor element for the capture of the second sub-image.

In some embodiments, the aspheric lens 360 reduces the impact in a first dimension by the shape and arrangement of the lens. As illustrated in FIG. 3B, the aspheric lens 360 is 7.5 mm in width in the Y-dimension, while such lens is substantially larger in the X-dimension. However, the lens captures additional light in comparison with a spherical lens. Further, the image sensor 370 is increased in size in the X-dimension, thus reducing any impact in the Y-dimension for the camera assembly 350 while improving the low light performance of the camera assembly.

Figure 4:
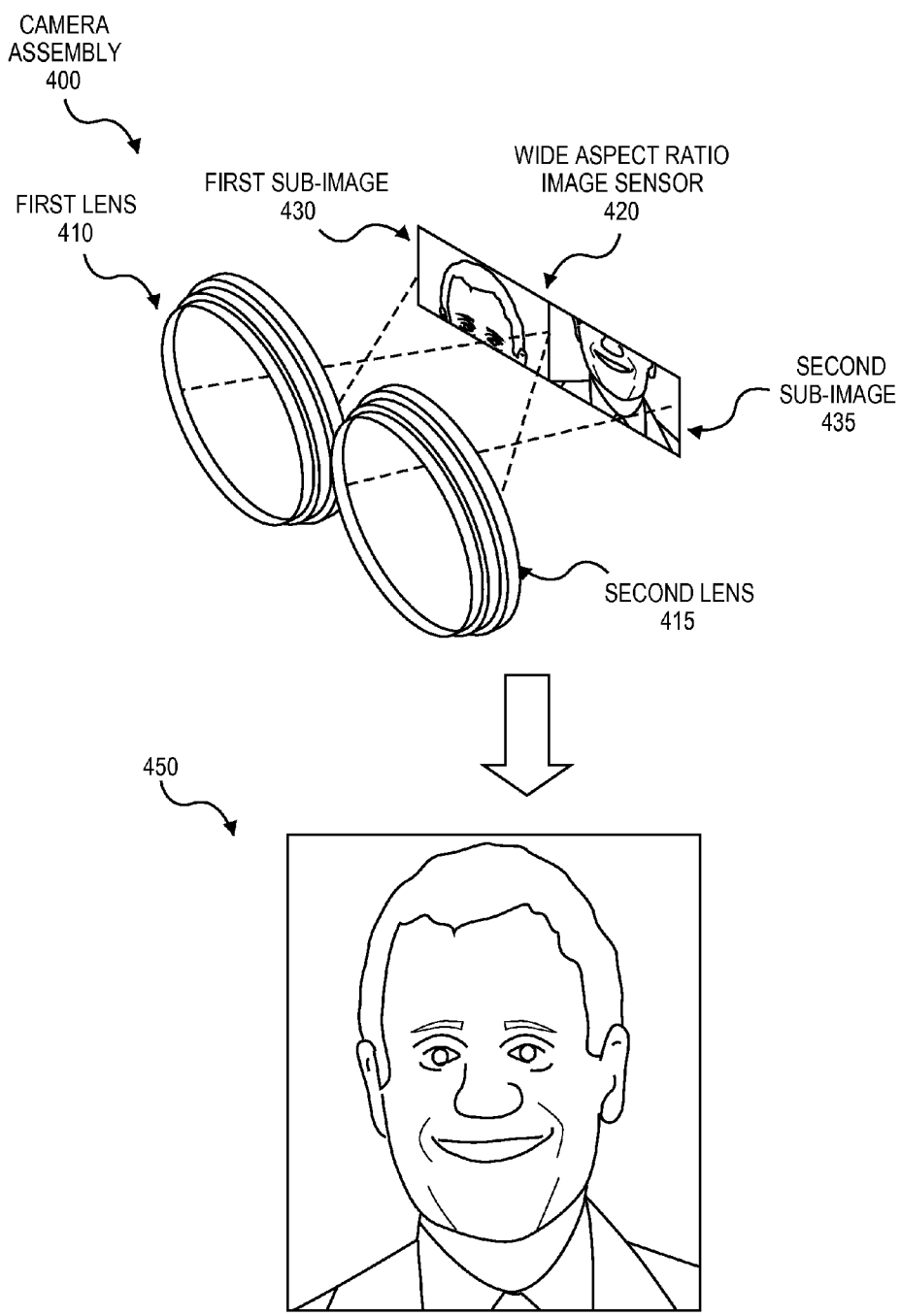
FIG. 4 is an illustration of the capture of an image utilizing an embodiment of a camera assembly including multiple lenses.

FIG. 4 is an illustration of the capture of an image utilizing an embodiment of a camera assembly including multiple lenses. In some embodiments, a camera assembly 400 includes multiple lenses, including a first lens 410 and a second lens 415, to simultaneously capture multiple sub-images, such as a first sub-image 430 transmitted via the first lens 410 and a second sub-image 435 transmitted via the second lens 415. In some embodiments, the first lens and the second lens are arranged in a second dimension (X-dimension, or horizontal in FIG. 4) to reduce width in a first dimension (Y-dimension, or vertical in FIG. 4). In some embodiments, the camera assembly 400 further includes a wide aspect ratio image sensor 420, wherein the image sensor 420 is sufficiently sized to allow the capture of the first sub-image 430 adjacent to the second sub-image 435 in the X-dimension, or horizontally in the illustration. In some embodiments, the wide aspect ratio image sensor 420 includes a single sensor element, and in some embodiments the image sensor includes multiple sensor elements.

In some embodiments, as illustrated in FIG. 4 the first sub-image 430 and second sub-image 435 are portions of the full image arranged vertically (along the first dimension), such as the first sub-image 430 being a top portion of a full image of the scene and the second sub-image 435 being a bottom portion of the full image of the scene. In some embodiments, the multiple sub-images are captured in a horizontal arrangement (along the second dimension) on the image sensor. Thus, the first sub-image 430, being a first vertically arranged sub-image (the top sub-image in FIG. 4), is arranged in a first horizontal position (a left position in FIG. 4), and the second sub-image 435, being a second vertically arranged sub-image (the bottom sub-image in FIG. 4), is arranged in a second horizontal position (a right position in FIG. 4).

In some embodiments, the multiple sub-images 430, 435 are processed to generate a combined image 450 of the original scene. In some embodiments, the sub-images 430, 435 are rearranged in processing to return such sub-images to their original position in the combined image 450 of the scene. In the example illustrated in FIG. 4, the first sub-image 430 captured in the left portion of the image sensor 420 is processed to become a top portion of the combined image 450, and the second sub-image 435 captured in the right portion of the image sensor 420 is processed to become a top portion of the combined image 450. In some embodiments, processing of sub-images includes image stabilization, correction of sensor/lens spatial separation, and merging of sub-images into the combined image 450.

Figure 5:
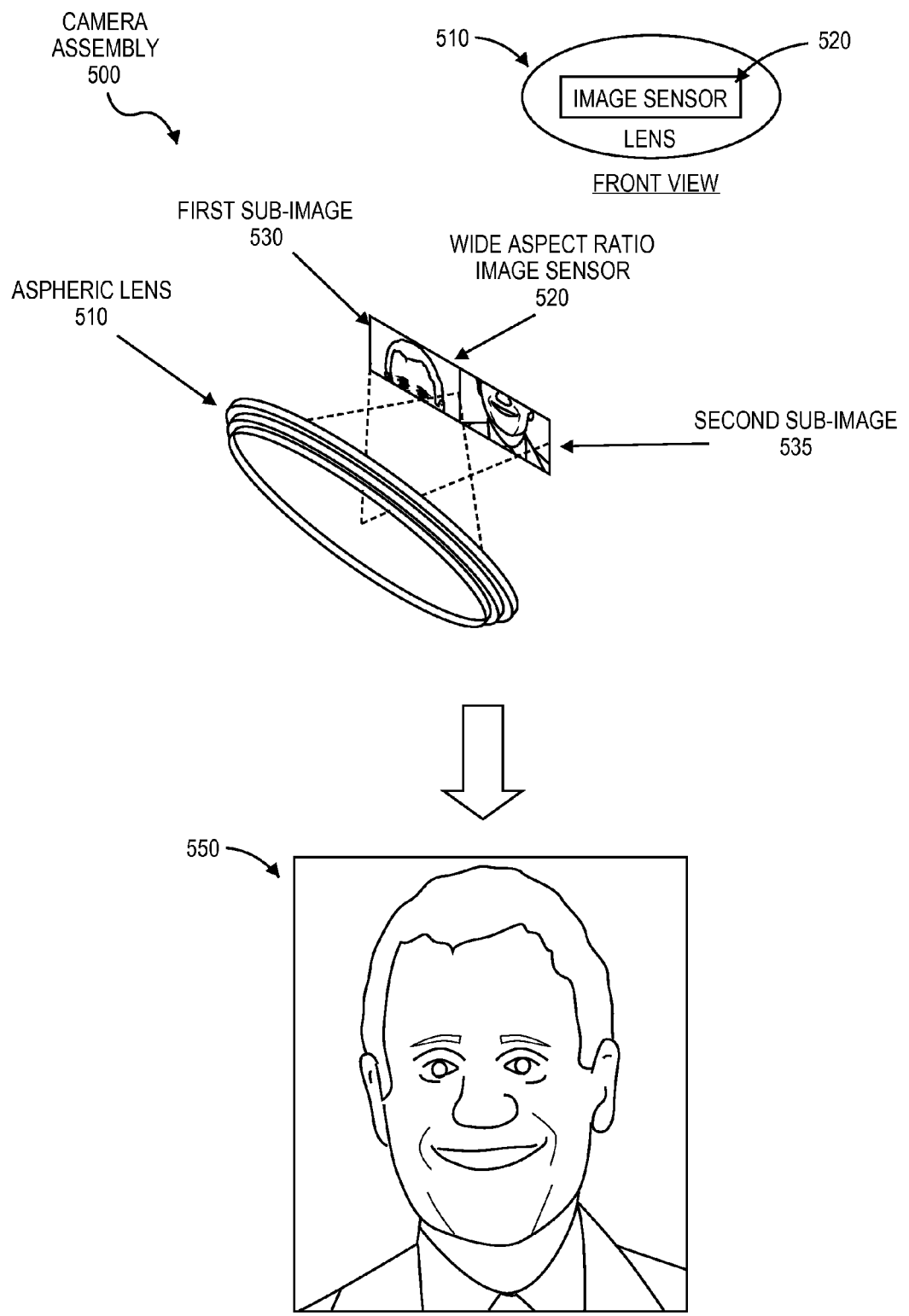
FIG. 5 is an illustration of the capture of an image utilizing an embodiment of a camera assembly including an aspheric lens.

FIG. 5 is an illustration of the capture of an image utilizing an embodiment of a camera assembly including an aspheric lens. In some embodiments, a camera assembly 500 includes an aspheric lens 510 to simultaneously capture multiple sub-images, such as a first sub-image 530 and a second sub-image 535 captured via the aspheric lens. In some embodiments, the aspheric lens is an oval lens or other lens shape that is larger in one dimension than in a second dimension arranged such that the larger dimension (such as the semi-major axis of an oval-shaped lens) is aligned in a second dimension (X-dimension, or horizontal in FIG. 5) and the smaller dimension (such as the semi-minor axis of an oval-shaped lens) is aligned in a first dimension (Y-dimension, or vertical in FIG. 5) to reduce width in the first dimension. In some embodiments, the camera assembly 500 further includes a wide aspect ratio image sensor 520, wherein the image sensor 520 is sufficiently wide to allow the capture of the first sub-image 530 adjacent to the second sub-image 535 in the X-dimension, or horizontally in the illustration. In some embodiments, the wide aspect ratio image sensor 520 includes a single sensor element, and in some embodiments the image sensor includes multiple sensor elements.

In some embodiments, as illustrated in FIG. 5 the first sub-image 530 and second sub-image 535 are portions of the full image arranged vertically (along the first dimension), such as the first sub-image 530 being a top portion of a full image of the scene and the second sub-image 535 being a bottom portion of the full image of the scene. In some embodiments, the multiple sub-images are captured in a horizontal arrangement (along the second dimension) on the image sensor. Thus, the first sub-image 530, being a first vertically arranged sub-image (the top sub-image in FIG. 5), is arranged in a first horizontal position (a left position in FIG. 5), and the second sub-image 535, being a second vertically arranged sub-image (the bottom sub-image in FIG. 5), is arranged in a second horizontal position (a right position in FIG. 5).

In some embodiments, the multiple sub-images 530, 535 are processed to generate a combined image 550 of the original scene. In some embodiments, the sub-images 530, 535 are rearranged in processing to return such sub-images to their original position in the combined image 550 of the scene. In the example illustrated in FIG. 5, the first sub-image 530 captured in the left portion of the image sensor 520 is processed to become a top portion of the combined image 550, and the second sub-image 535 captured in the right portion of the image sensor 520 is processed to become a lower (or bottom) portion of the combined image 550.

Figure 6:
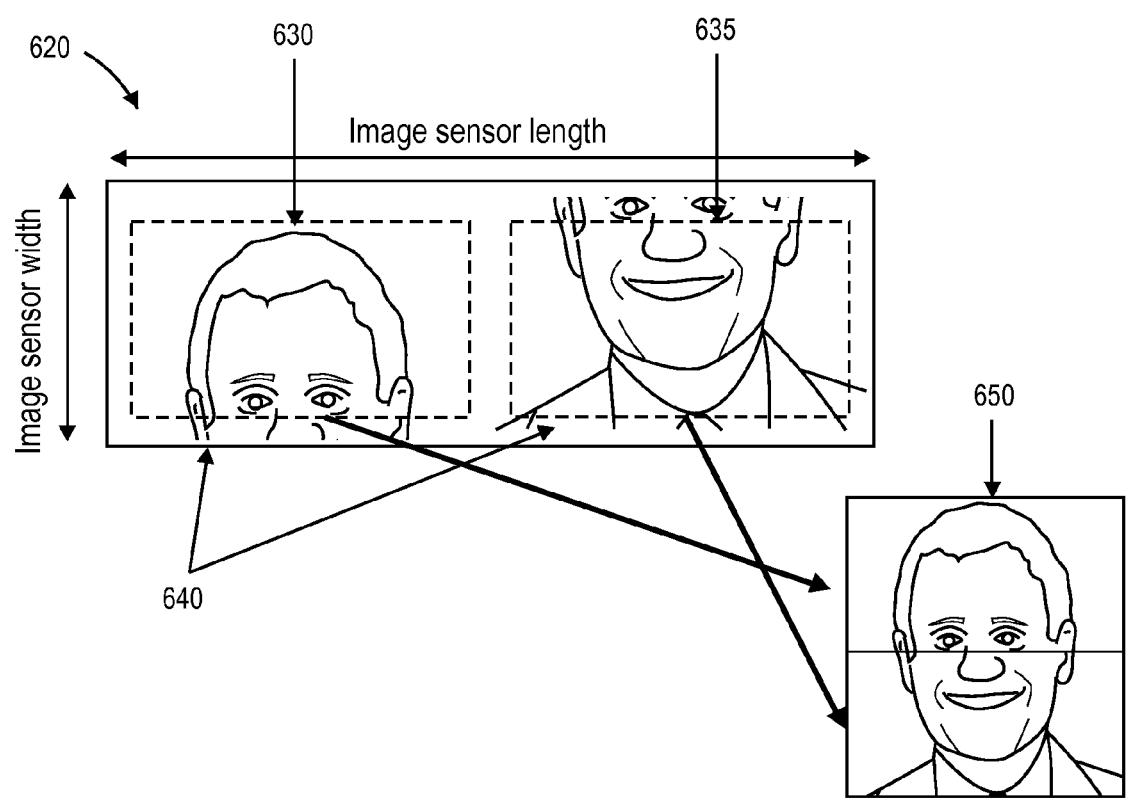
FIG. 6 is an illustration of stitching sub-images together to generate a combined image according to an embodiment.

FIG. 6 is an illustration of combining sub-images to generate a combined image according to an embodiment. In some embodiments, an image sensor 620 is a wide aspect ratio with a width (Y-dimension) that is significantly shorter than a length (X-dimension). In some embodiments, a first sub-image 630 is captured in a first portion of the image sensor 620 and a second sub-image 635 is captured in a second portion of the image sensor 620.

In some embodiments, the first sub-image 630 and the second sub-image 635 may have spatial separation 640 because of imperfect operation of the one or more lenses or the image sensor. In some embodiments, the multiple sub-images 630, 635 are processed, wherein the processing may include image stabilization, correction of sensor or lens spatial separation, such as cropping one or more of the sub-images to remove over-lapping between the sub-images and aligning the cropped sub-images, and combining the sub-images generate a combined image 650.

Figure 7:
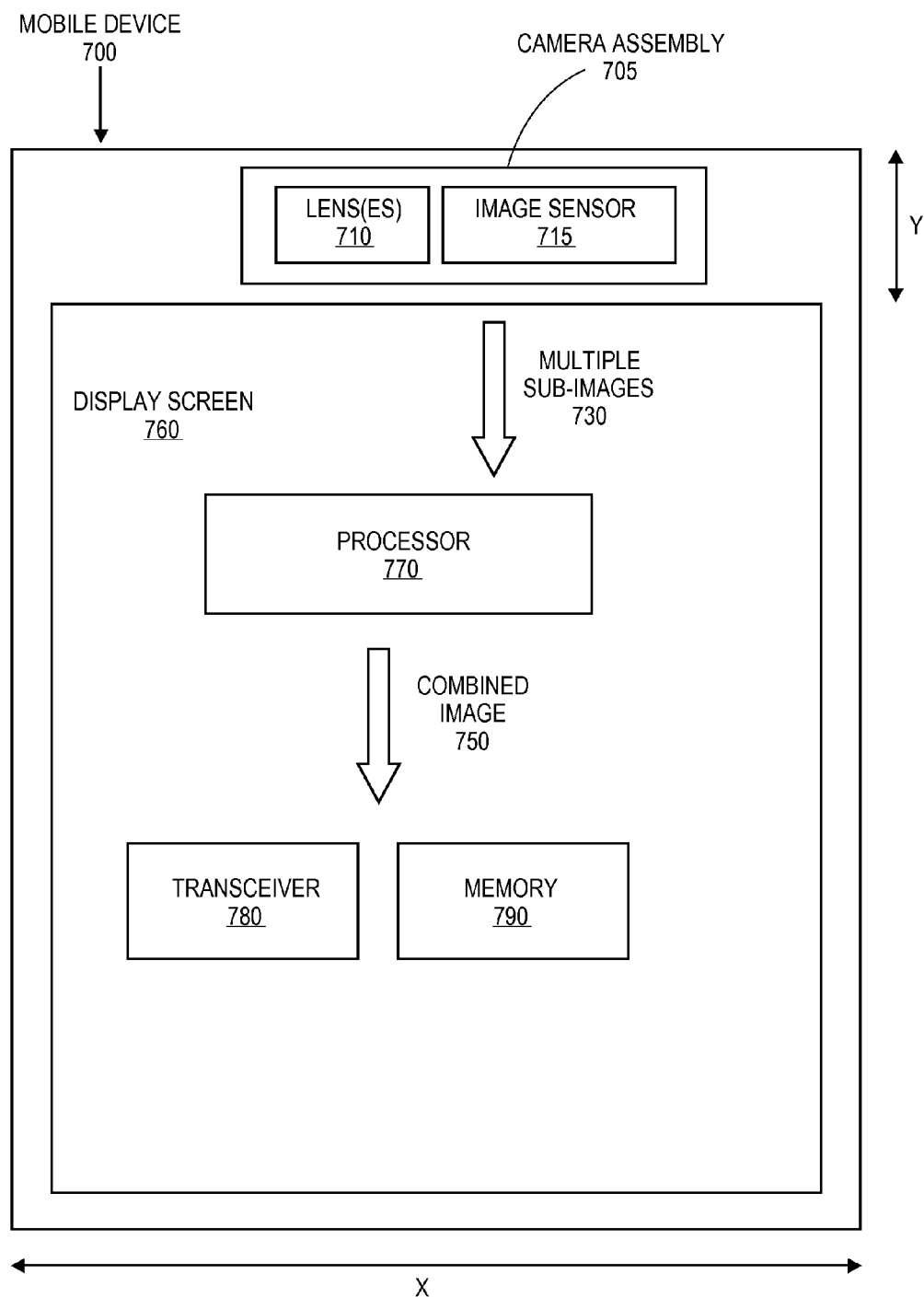
FIG. 7 is an illustration of an embodiment of a mobile device including a camera assembly.

FIG. 7 is a block diagram of an embodiment of a mobile device including a camera assembly. In some embodiments, a mobile device 700 includes a camera assembly including one or more lenses 710, wherein the one or more lenses may include multiple lenses, such as the multiple lenses 410, 415 illustrated in FIG. 4 or the aspheric lens 510 illustrated in FIG. 5, and a wide aspect ratio image sensor 715, such as the wide aspect image 420 or 520 illustrated in FIG. 4 or FIG. 5 respectively. In some embodiments, the camera assembly 705 is a front-facing camera with the one or more lenses of the camera assembly on a same side as a display screen 760, and thus the camera assembly is located in a limited Y-dimension space of the mobile device. The one or more lenses 710 and the wide aspect ratio image sensor 715 are arranged such that a longer dimension of such elements is arranged in an X-dimension of the mobile device 700 and a shorter dimension of such elements is arranged in the Y-dimension of the mobile device 700.

In some embodiments, the camera assembly 705 is operable to simultaneously capture multiple sub-images 730 on the image sensor, wherein the sub-images are captured in an arrangement along the X-dimension. In some embodiments, a processor 770, which may be a general-purpose processor, a dedicated graphics processor, or other image processing element of the mobile device 700, receives the multiple sub-images 730 for processing. In some embodiments, the processing of the sub-images may be as illustrated in FIG. 6, wherein the processing of the sub-images includes image stabilization, correction of lens or image sensor spatial separation, and merging the two images into a combined image 750. In some embodiments, the processor may provide the combined image for display on the screen 760, for transmission using a transceiver 780 to another device, including transmission of the image in a video stream for a video communication, for storage in a memory 790, or a combination of such operations.

Figure 8:
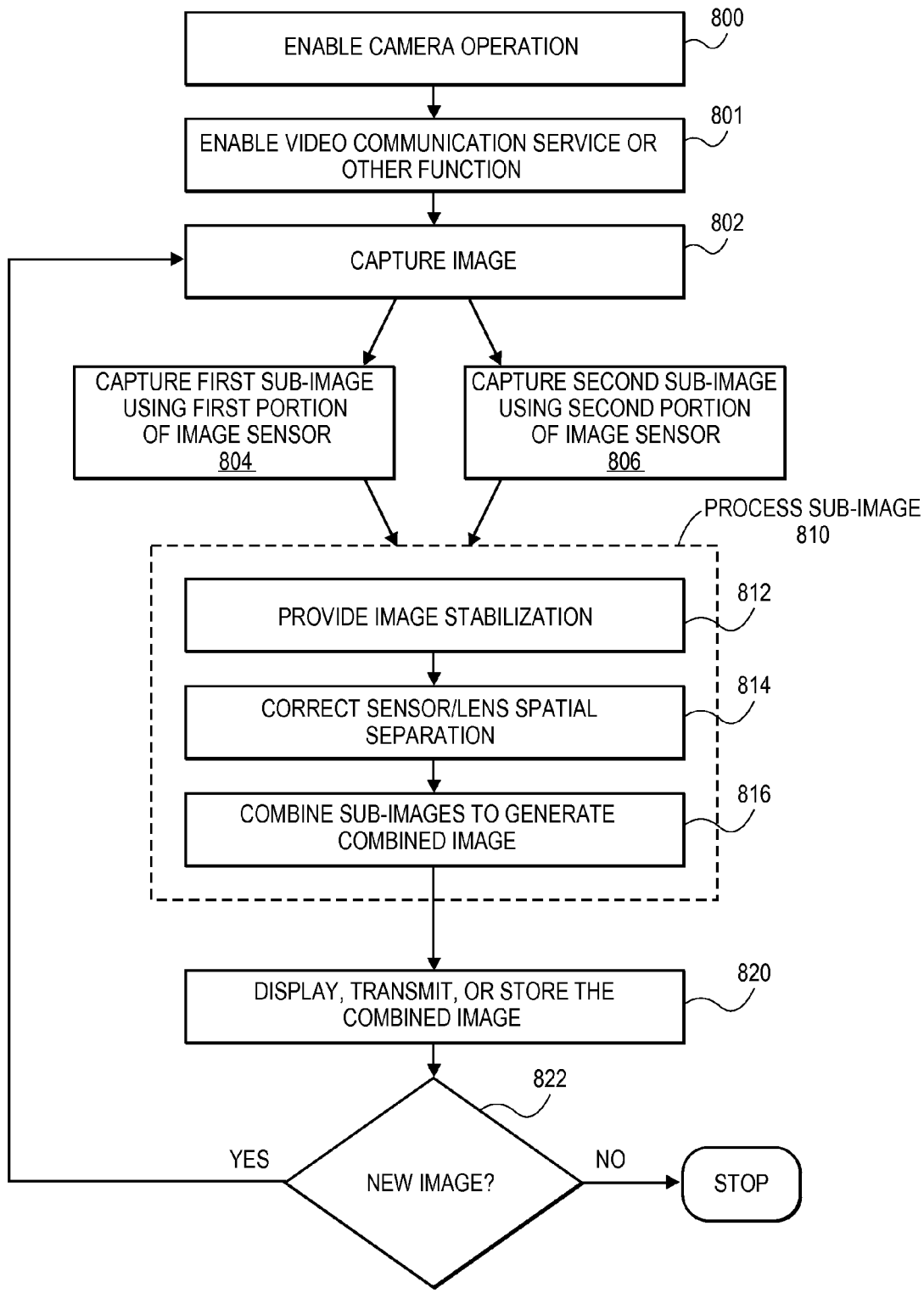
FIG. 8 is a flow chart to illustrate an embodiment of a process to generate a combined image from captured sub-images.

FIG. 8 is a flow chart to illustrate an embodiment of a process to generate a combined image from captured sub-images. In some embodiments, a process includes enabling a camera function 800, and may further include enabling a video communication service (such as Skype or Lync) or other function 801. In some embodiments, the process includes capturing an image 802, which may be a single image or one image in a series of images, such as a video stream. In some embodiments, the capture of the image includes simultaneously capturing multiple sub-images, including capturing a first sub-image using a first portion of an image sensor and capturing a second sub-image using a second portion of the image sensor, wherein the image sensor is a wide aspect ratio image sensor. For example, the first sub-image may be an upper portion of a full image of a scene and the second sub-image may be a lower portion of the full image of the scene.

In some embodiments, the process further includes processing the sub-images 810, wherein the processing may include providing image stabilization 812, correcting sensor or lens spatial separation (which may include eliminating overlap between the sub-images and aligning the sub-images for combination) 814, and combining the multiple sub-images, including the first sub-image and the second sub-image, to generate a combined image of the original scene 816. In some embodiments, the process may further include displaying the combined image, transmitting the combined image to another user (such as, for example, if the combined image is one image in a series of images for a video stream), storing the combined image in a memory, or a combination of such operations 820. If there is an additional new image for capture 822, such as if a video communicating session is continuing, then the process returns to the capturing of the next image 802.

Figure 9:
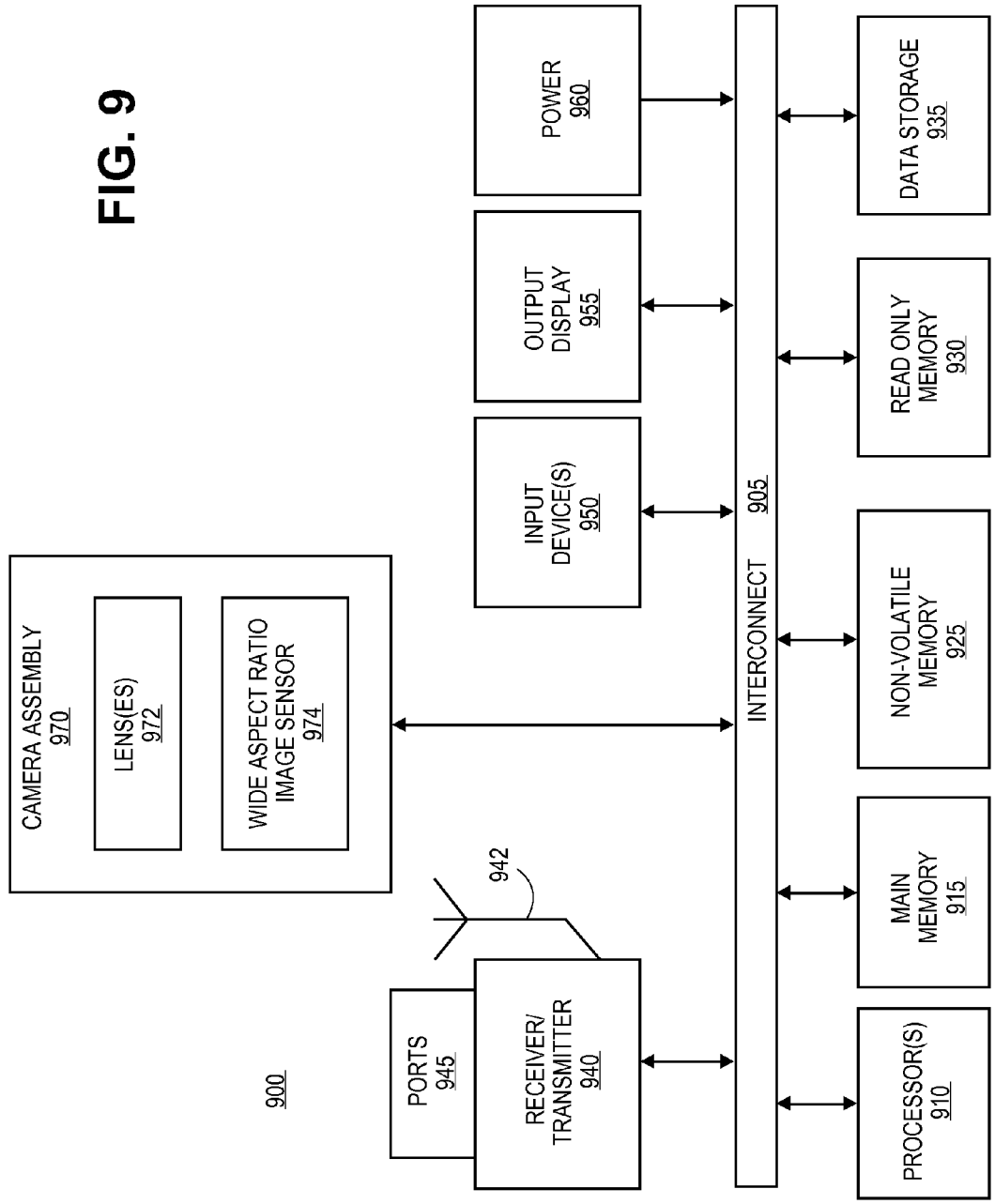
FIG. 9 illustrates an apparatus or system to generate combined images from captured sub-images.

FIG. 9 illustrates an apparatus or system to generate combined images from captured sub-images. In this illustration, certain standard and well-known components that are not germane to the present description are not shown. Elements shown as separate elements may be combined, including, for example, an SoC (System on Chip) combining multiple elements on a single chip. The apparatus or system may include, but is not limited to, a mobile device.

Under some embodiments, the apparatus or system 900 (referred to generally herein as an apparatus) includes an interconnect or crossbar 905 or other communication means for transmission of data. The interconnect 905 is illustrated as a single interconnect for simplicity, but may represent multiple different interconnects or buses and the component connections to such interconnects may vary. The interconnect 905 shown in FIG. 9 is an abstraction that represents any one or more separate physical buses, point-to-point connections, or both connected by appropriate bridges, adapters, or controllers.

In some embodiments, the apparatus 900 includes a camera assembly 970, wherein the camera assembly includes one or more lenses 972 to collect light for multiple sub-images of a scene and a wide aspect ratio image sensor 974 to capture the plurality of sub-images. The camera assembly 970 may include the camera assembly 400 illustrated in FIG. 4 or the camera assembly 500 illustrated in FIG. 5.

The apparatus 900 may include a processing means such as the one or more processors 910 coupled to the interconnect 905 for processing information. The processors 910 may comprise one or more physical processors and one or more logical processors. In some embodiments, the processors may include a general-purpose processor. In some embodiments, the processors 910 may include an additional image processing element. In some embodiments, functions of the processors 910 include the processing of the sub-images captured by the camera assembly 970 to generate a combined image.

In some embodiments, the apparatus 900 includes one or more transmitters or receivers 940 coupled to the interconnect 905. In some embodiments, the apparatus 900 may include one or more antennas 942 for the transmission and reception of data via wireless communication. In some embodiments, the apparatus 900 includes one or more ports 945 for the transmission and reception of data via wired communications. In some embodiments, the data that is transmitted and received includes image data, including the transmission of combined images generated from collected sub-images by the camera assembly 970, where the transmitted combined images may be a stream of video images.

In some embodiments, the apparatus 900 further comprises a random access memory (RAM) or other dynamic storage device or element as a main memory 915 for storing information and instructions to be executed by the processors 910. The apparatus 900 may include one or more non-volatile memory elements 925, including, for example, flash memory, for the storage of certain elements. The apparatus 900 also may comprise a read only memory (ROM) 930 or other static storage device for storing static information and instructions for the processors 910, and data storage 935, such as a solid state drive, for the storage of data. In some embodiments, memory of the apparatus 900 may include storage for combined images generated from the sub-images collected by the camera assembly 970.

In some embodiments, the apparatus 900 includes one or more input devices 950 for the input of data, including hard and soft buttons, a joy stick, a mouse or other pointing device, voice command system, or gesture recognition system. In some embodiments, the apparatus 900 includes an output display 955, where the display 955 may include a liquid crystal display (LCD) or any other display technology, for displaying information or content to a user. In some environments, the display 955 may include a touch-screen that is also utilized as at least a part of an input device 950. In some embodiments, the display 955 may display combined images generated from the sub-images collected by the camera assembly 970.

The apparatus 900 may also comprise a battery or other power source 960, which may include a solar cell, a fuel cell, a charged capacitor, near field inductive coupling, or other system or device for providing or generating power in the apparatus 900. The power provided by the power source 960 may be distributed as required to elements of the apparatus 900.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, compact disk read-only memory (CD-ROM), and magneto-optical disks, read-only memory (ROM), random access memory (RAM), erasable programmable read-only memory (EPROM), electrically-erasable programmable read-only memory (EEPROM), magnet or optical cards, flash memory, or other type of computer-readable medium suitable for storing electronic instructions. Moreover, embodiments may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

In some embodiments, a camera assembly includes one or more lenses to transmit light from a scene; and an image sensor to simultaneously capture multiple sub-images of the scene via the one or more lenses, the sub-images including a first sub-image and a second sub-image. In some embodiments, a processing element is to process the sub-images sensed by the image sensor, the processing of the sub-images includes combining at least the first sub-image and the second sub-image to generate a combined image of the scene.

In some embodiments, the image sensor is a wide aspect ratio image sensor that is smaller in a first dimension than in a second dimension. In some embodiments, the sub-images are captured on portions of the image sensor along the second dimension, including a first portion of the image sensor to capture the first sub-image and a second portion of the image sensor to capture the second sub-image.

In some embodiments, the one or more lenses of the camera assembly include multiple lenses, including a first lens to transmit light for the first sub-image and a second lens to transmit light for the second sub-image.

In some embodiments, the one or more lenses of the camera assembly include an aspheric lens to transmit light for the first sub-image and the second sub-image.

In some embodiments, the image sensor of the camera assembly includes a single sensor element. In some embodiments, the image sensor of the camera assembly includes multiple sensor elements.

In some embodiments, the processing of the sub-images further includes correction of spatial separation of the first sub-image and the second sub-image.

In some embodiments, an apparatus includes a camera assembly including one or more lenses to transmit light from a scene, and an image sensor to simultaneously capture multiple sub-images of the scene from the one or more lenses, the sub-images including a first sub-image and a second sub-image; a processing element, the processing element to process the sub-images sensed by the image sensor; and a transceiver to transmit one or more images. In some embodiments, the processing of the sub-images includes combining the sub-images to generate a combined image of the scene.

In some embodiments, the image sensor is a wide aspect ratio image sensor that is smaller in a first dimension than in a second dimension, wherein the sub-images are captured on portions of the image sensor along the second dimension, including a first portion of the image sensor to capture the first sub-image and a second portion of the image sensor to capture the second sub-image.

In some embodiments, the first sub-image is a sub-image of an upper portion of the scene and the second sub-image is sub-image of a lower portion of the scene.

In some embodiments, the one or more lenses of the camera assembly include multiple lenses, including a first lens to transmit light for the first sub-image and a second lens to transmit light for the second sub-image.

In some embodiments, the one or more lenses of the camera assembly include an aspheric lens to transmit light for the first sub-image and the second sub-image.

In some embodiments, the processing of the sub-images further includes correction of spatial separation of the first sub-image and the second sub-image.

In some embodiments, the apparatus is a mobile device. In some embodiments, the mobile device includes a display screen in a front side of the mobile device, the one or more lenses also being in the front side of the mobile device.

In some embodiments, the combined image is one of multiple images in a data stream, the transceiver being operable to transmit the data stream.

In some embodiments, a non-transitory computer-readable storage medium having stored thereon data representing sequences of instructions that, when executed by a processor, cause the processor to perform operations including enabling operation of a camera, the camera including one or more lenses and an image sensor; simultaneously capturing by the image sensor multiple sub-images of a scene, the sub-images including a first sub-image and a second sub-image; and processing the sub-images captured by the image sensor, wherein the processing of the sub-images includes combining the sub-images to generate a combined image of the scene.

In some embodiments, capturing the sub-images includes capturing each sub-image on a different portion of the image sensor, including capturing the first sub-image on a first portion of the image sensor and capturing the second sub-image on a second portion of the image sensor.

In some embodiments, the one or more lenses include: multiple lenses, including a first lens to transmit light for the first sub-image and a second lens to transmit light for the second sub-image; or an aspheric lens to transmit light for the first sub-image and the second sub-image.

In some embodiments, the processing of the sub-images further includes correction of spatial separation of the first sub-image and the second sub-image. In some embodiments, the processing of the sub-images further includes image stabilization for the sub-images.

In some embodiments, a method includes: enabling operation of a camera assembly, the camera assembly including one or more lenses and an image sensor; enabling a video communication; simultaneously capturing by the image sensor a multiple sub-images of a scene, the sub-images including a first sub-image and a second sub-image; processing the sub-images captured by the image sensor, wherein the processing of the sub-images includes combining the sub-images to generate a combined image of the scene; and transmitting the image as a part of a data stream for the video communication.

In some embodiments, capturing the sub-images includes capturing each sub-image on a different portion of the image sensor, including capturing the first sub-image on a first portion of the image sensor and capturing the second sub-image on a second portion of the image sensor.

In some embodiments, the one or more lenses include: multiple lenses, including a first lens to transmit light for the first sub-image and a second lens to transmit light for the second sub-image; or an aspheric lens to transmit light for the first sub-image and the second sub-image.

In some embodiments, the processing of the sub-images further includes correction of spatial separation of the first sub-image and the second sub-image. In some embodiments, the processing of the sub-images further includes image stabilization for the plurality of sub-images.

In some embodiments, an apparatus includes a means for enabling operation of a camera, the camera including one or more lenses and an image sensor; a means for simultaneously capturing by the image sensor a plurality of sub-images of a scene, the plurality of sub-images including a first sub-image and a second sub-image; and a means for processing the plurality of sub-images captured by the image sensor, wherein the processing of the sub-images includes combining the plurality of sub-images to generate a combined image of the scene.

In some embodiments, capturing the plurality of sub-images includes capturing each sub-image on a different portion of the image sensor, including capturing the first sub-image on a first portion of the image sensor and capturing the second sub-image on a second portion of the image sensor.

In some embodiments, the one or more lenses of the apparatus include: a plurality of lenses, including a first lens to transmit light for the first sub-image and a second lens to transmit light for the second sub-image; or an aspheric lens to transmit light for the first sub-image and the second sub-image.

In some embodiments, the processing of the sub-images by the means for processing further includes correction of spatial separation of the first sub-image and the second sub-image. In some embodiments, the processing of the sub-images by the means for processing further includes image stabilization for the plurality of sub-images.

What is claimed is:

1. A camera assembly comprising:
   one or more lenses to transmit light from a scene; and
   an image sensor to simultaneously capture a plurality of sub-images of the scene via the one or more lenses, the image sensor being a wide aspect ratio image sensor that is smaller in a first dimension than in a second dimension, the first dimension being a Y-dimension and the second dimension being an X-dimension, and the plurality of sub-images including a first sub-image and a second sub-image;
   wherein the plurality of sub-images are portions of an image of the scene along the Y-dimension of the scene, and wherein each of the plurality of sub-images along the Y-dimension of the scene is captured on the image sensor on a different portion of the image sensor along the X-dimension of the image sensor, including a first portion of the image sensor to capture the first sub-image and a second portion of the image sensor to capture the second sub-image; and
   wherein a processing element is to process the sub-images sensed by the portions of the image sensor along the X-dimension of the image sensor, the processing of the sub-images includes combining at least the first sub-image and the second sub-image along the Y-dimension to generate a combined image of the scene.

2. The camera assembly of claim 1, wherein the one or more lenses include a plurality of lenses arranged along the X-dimension to collect light for sub-images along the Y-dimension, including a first lens to transmit light for the first sub-image and a second lens to transmit light for the second sub-image.

3. The camera assembly of claim 1, wherein the one or more lenses include an aspheric lens to transmit light for the first sub-image and the second sub-image, the aspheric lens being larger in the X-dimension than in the Y-dimension.

4. The camera assembly of claim 1, wherein the image sensor includes a single sensor element.

5. The camera assembly of claim 1, wherein the image sensor includes a plurality of sensor elements.

6. The camera assembly of claim 1, wherein the processing of the sub-images further includes correction of spatial separation of the first sub-image and the second sub-image in the combining of the first sub-image and the second sub-image along the Y-dimension.

7. The camera assembly of claim 1, wherein the first sub-image is a sub-image of an upper portion of the scene along the Y-dimension and the second sub-image is sub-image of a lower portion of the scene along the Y-dimension, and wherein the first image and the second image are captured side-by-side along the X-dimension on the image sensor.

8. An apparatus comprising:
   a camera assembly including:
      one or more lenses to transmit light from a scene, and
      an image sensor to simultaneously capture a plurality of sub-images of the scene from the one or more lenses, the image sensor being a wide aspect ratio image sensor that is smaller in a first dimension than in a second dimension, the first dimension being a Y-dimension and the second dimension being an X-dimension, and the plurality of sub-images including a first sub-image and a second sub-image;
   a processing element, the processing element to process the sub-images sensed by the image sensor; and
   a transceiver to transmit one or more images;
   wherein the plurality of sub-images are portions of an image of the scene along the Y-dimension of the scene, and wherein each of the plurality of sub-images along the Y-dimension of the scene is captured on the image sensor on a different portion of the image sensor along the X-dimension of the image sensor, including a first portion of the image sensor to capture the first sub-image and a second portion of the image sensor to capture the second sub-image; and
   wherein the processing of the sub-images captured by the portions of the image sensor along the X-dimension of the image sensor includes combining the plurality of sub-images along the Y-dimension to generate a combined image of the scene.

9. The apparatus of claim 8, wherein the first sub-image is a sub-image of an upper portion of the scene along the Y-dimension and the second sub-image is sub-image of a lower portion of the scene along the Y-dimension, and wherein the first image and the second image are captured side-by-side along the X-dimension on the image sensor.

10. The apparatus of claim 8, wherein the one or more lenses include a plurality of lenses arranged along the X-dimension to collect light for sub-images along the Y-dimension, including a first lens to transmit light for the first sub-image and a second lens to transmit light for the second sub-image.

11. The apparatus of claim 8, wherein the one or more lenses include an aspheric lens to transmit light for the first sub-image and the second sub-image, the aspheric lens being larger in the X-dimension than in the Y-dimension.

12. The apparatus of claim 8, wherein the processing of the sub-images further includes correction of spatial separation of the first sub-image and the second sub-image in the combining of the first sub-image and the second sub-image along the Y-dimension.

13. The apparatus of claim 8, wherein the apparatus is a mobile device.

14. The apparatus of claim 13, wherein the mobile device includes a display screen in a front side of the mobile device, the one or more lenses also being in the front side of the mobile device.

15. The apparatus of claim 8, wherein the combined image is one of a plurality of images in a data stream, the transceiver being operable to transmit the data stream.

16. A non-transitory computer-readable storage medium having stored thereon data representing sequences of instructions that, when executed by a processor, cause the processor to perform operations comprising:
   enabling operation of a camera, the camera including one or more lenses and an image sensor, the image sensor being a wide aspect ratio image sensor that is smaller in a first dimension than in a second dimension, the first dimension being a Y-dimension and the second dimension being an X-dimension;
   simultaneously capturing by the image sensor a plurality of sub-images of a scene, the plurality of sub-images including a first sub-image and a second sub-image, wherein the plurality of sub-images are portions of an image of the scene along the Y-dimension of the scene, and wherein each of the plurality of sub-images along the Y-dimension of the scene is captured on the image sensor on a different portion of the image sensor along the X-dimension of the image sensor, including a first portion of the image sensor to capture the first sub-image and a second portion of the image sensor to capture the second sub-image; and processing the plurality of sub-images captured by the portions of the image sensor along the X-dimension of the image sensor, wherein the processing of the sub-images includes combining the plurality of sub-images along the Y-dimension to generate a combined image of the scene.

17. The article of claim 16, wherein the one or more lenses include:
   a plurality of lenses arranged along the X-dimension to collect light for sub-images along the Y-dimension, including a first lens to transmit light for the first sub-image and a second lens to transmit light for the second sub-image; or
   an aspheric lens to transmit light for the first sub-image and the second sub-image, the aspheric lens being larger in the X-dimension than in the Y-dimension.

18. The article of claim 16, wherein the processing of the sub-images further includes correction of spatial separation of the first sub-image and the second sub-image in the combining of the first sub-image and the second sub-image along the Y-dimension.

19. The article of claim 16, wherein the processing of the sub-images further includes image stabilization for the plurality of sub-images.

20. A method comprising:
   enabling operation of a camera assembly, the camera assembly including one or more lenses and an image sensor, the image sensor being a wide aspect ratio image sensor that is smaller in a first dimension than in a second dimension, the first dimension being a Y-dimension and the second dimension being an X-dimension;
   enabling a video communication;
   simultaneously capturing by the image sensor a plurality of sub-images of a scene, the plurality of sub-images including a first sub-image and a second sub-image, wherein the plurality of sub-images are portions of an image of the scene along the Y-dimension of the scene, and wherein capturing the plurality of sub-images along the Y-dimension of the scene includes capturing each sub-image on a different portion of the image sensor along the X-dimension of the image sensor, including capturing the first sub-image on a first portion of the image sensor and capturing the second sub-image on a second portion of the image sensor;
   processing the plurality of sub-images captured by the portions of the image sensor along the X-dimension of the image sensor, wherein the processing of the sub-images includes combining the plurality of sub-images along the Y-dimension to generate a combined image of the scene; and
   transmitting the combined image of the scene as a part of a data stream for the video communication.

21. The method of claim 20, wherein the one or more lenses include:
   a plurality of lenses arranged along the X-dimension to collect light for sub-images along the Y-dimension, including a first lens to transmit light for the first sub-image and a second lens to transmit light for the second sub-image; or
   an aspheric lens to transmit light for the first sub-image and the second sub-image, the aspheric lens being larger in the X-dimension than in the Y-dimension.

* * * * *